United States Patent [19]

Strauff

[11] 3,972,266
[45] Aug. 3, 1976

[54] CONTROL CYLINDER ASSEMBLY FOR SERVO STEERING SYSTEMS

[75] Inventor: Gunther Strauff, Kaarst, Germany

[73] Assignee: Langen & Co., Duesseldorf, Germany

[22] Filed: Nov. 11, 1974

[21] Appl. No.: 522,905

[30] Foreign Application Priority Data

Nov. 10, 1973 Germany............................ 2356332

[52] U.S. Cl. .............................. 91/417 R; 91/434; 92/108; 92/116
[51] Int. Cl.² ...................... F15B 15/17; F16J 1/10; F01B 31/00
[58] Field of Search ................ 92/108, 116; 91/380, 91/417 R, 434

[56] References Cited

UNITED STATES PATENTS

| | | | |
|---|---|---|---|
| 2,938,399 | 5/1960 | Briggs | 92/108 |
| 3,010,335 | 11/1961 | Foerster et al. | 91/380 |

Primary Examiner—Paul E. Maslousky
Attorney, Agent, or Firm—Holman & Stern

[57] ABSTRACT

A control cylinder assembly for servo-steering systems including a fluid pressure circuit and steering shaft and an output shaft, in which a servo piston is supported during axial travel by axially spaced sleeves connected to a housing cover and the sleeves form circumposed fluid areas, and the piston forms opposed variable-volume operational areas, all of the areas being operatively connected in a fluid pressure circuit.

4 Claims, 1 Drawing Figure

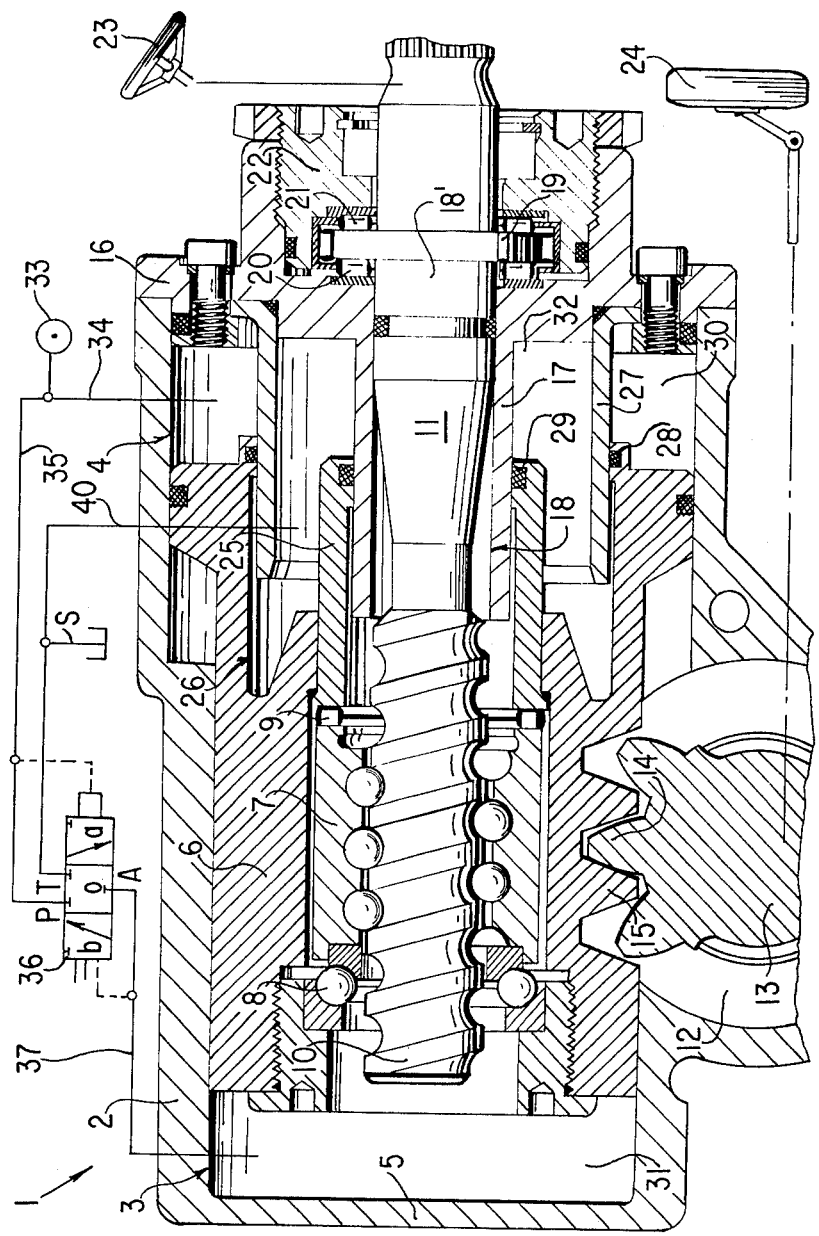

CONTROL CYLINDER ASSEMBLY FOR SERVO STEERING SYSTEMS

FIELD OF THE INVENTION

The instant invention concerns an improved control cylinder assembly for servo steering systems.

BACKGROUND OF THE INVENTION

Prior art servo-assemblies have included an axially-displacable servo-piston arranged in a cylindrical housing dividing the housing into two operating chambers or areas; an axial bore of the servo-piston includes an integral steering nut cooperating with a steering worm shaft or alternatively the servo-piston cooperates with a steering gear nut which is axially disposed and journaled in the servo-piston; the servo-piston includes a gear segment operatively connected to a toothed segment of a drive or power-output shaft; the gear segment being formed on a non-guided portion of the servo-piston and which has slight relative rotation in the housing in which is is supported; a steering shaft has a support portion sealingly surrounded by a cover which forms one side of an operational area of the assembly and the shaft extends axially from the cover; the cover includes an axially-projecting, cylindrical portion telescoping into the servo-piston or into a portion connected thereto; this cylindrical projection will support travel or movement of the servo-piston during its lift or work strokes.

Control cylinder assemblies of the general character described above, have incorporated a construction where the bore of the servo-piston is exposed at the cover, for example, and relatively large functional areas are provided during reciprocation of the servo-piston in opposed directions of movement. It is generally the case where a steering gear nut is incorporated in the servo-piston that a valving system is operated by a radially extending lever movable in response to servo-piston movement. If operating areas of different sizes are incorporated in the control assembly, i.e., 2:1 ratio, for example, then the interior of the servo-motor piston must be tightly sealed and be in communication with a pressureless area and this area is generally sealed by a lid sealing the opposed end of the bore of the servo-piston. The problem arising from such an arrangement is that there generally results an outward projecting extending at least one half the amount of lift or axial movement of the servo-piston. Depending upon the centered position of the servo-piston, there must also be present between the end of the steering worm shaft and the inner area of the lid a sufficient space or distance corresponding to one half the axial travel of the servo-piston. Furthermore, it is necessary to provide similar axial distances between the outer area of the lid and end wall of the housing.

SUMMARY OF THE INVENTION

The present invention comprises an improved control cylinder assembly with two variable-volume operational areas in which the length of the unit not increased but is maintained at a minimum; these variable-volume areas can be utilized where valve actuation is initiated by means of a steering gear nut or where the inside of the servo piston is fixed, or partially fixed, to the assembly housing.

More particularly, the invention concerns an improved control cylinder assembly for servo-steering systems in which the housing cover includes in the assembly an axial sleeve projection which has a relatively large diameter and extends the length of the effective lift path of movement of the servo piston and supports the piston, and a second coaxial sleeve projection of smaller diameter is telescoped into a sleeve integrated with the servo-piston and projecting axially therefrom; the area defined between the axially projecting sleeve projections being connected to a low-pressure side of a fluid pressure system (return side) of a pressure source. The projection sleeves are integral with the housing cover comprising a cover constructed as a single element, or the larger diametered projection sleeve may be constructed as a separate element, connected to the cover and facilitating production and centering of the assembly when manufactured.

In addition to obtaining minimal length with an assembly of the character set forth, the effective diameter of the larger diametered projection sleeve makes it possible to alter the size of the operational areas, so that, as defined by this sleeve, can be one-half as large as the opposite or opposed operational area.

Further objects and advantages of the invention will become apparent from the following description of an exemplary embodiment, in conjunction with the drawing forming a part thereof, in which:

BRIEF DESCRIPTION OF THE DRAWING

The sole FIGURE of the drawing comprises an axial section through a control cylinder assembly in conjunction with a diagramatically illustrated steering axle-and-wheel, manually operable steering wheel, and fluid-operating circuit.

DESCRIPTION OF A PREFERRED EMBODIMENT

Referring to the drawing, a control cylinder assembly is indicated generally at 1 and comprises a cylindrical housing or block 2; the housing is provided with an end wall 5 defining one end of an operational chamber (to be described) and includes from end wall 5 an axial bore 3 communicating with a larger diametered bore 4. A servo-piston 6 has different diametered portions, respectively, reciprocatably supported in the bores 3 and 4, and is suitably peripherally sealed.

The servo-piston 6, for example, has an axial bore in which is assembled a steering nut 7 journaled and retained between suitable bearing assemblies 8 and 9; projecting into the steering nut 7 is a helically-grooved section (worm) 10 of a steering shaft (operating shaft) and ball elements are shown between cooperating portions of the worm 10 and correspondingly grooved portions of the steering nut 7.

The bore 3 of the housing 2 communicates with a transverse bore 12 normal to the longitudinal axis of the steering shaft 11 in which bore 12 is suitably journaled an output shaft 13 having the usual toothed segment 14 cooperating with a gear rack portion 15 on the servo piston 6; the intermediate portion of the servo piston at which the gear rack 15 is formed is an unsupported portion of the servo piston not required for axial guiding movement of the servo piston.

The bore 4 is closed by means of a suitably secured and sealed end plate or cover means 16, i.e., by machine screws, and the cover means includes an integral, axially projecting sleeve 17 extending toward the servo-piston 6. The sleeve and cover include an axial bore 18 supporting an uninterrupted portion 18' of the steering shaft 11. Integral with an intermediate portion of shaft portion 18' is an annular shoulder 19 cooperating with axial thrust bearings 20 and 21 which are adjustably assembled by means of a threaded retention cap nut 22 secured in an outward axial projection of cover 16.

The steering shaft is operatively connected, as shown diagramatically, to the usual manually-operated steering wheel 23 which initiates operation of the servo steering system in which control cylinder assembly is utilized. In this regard, the output shaft 13 is operatively connected, as shown diagramatically, to a steered wheel 24, and when the steering wheel 23 is rotated, the servo-piston will provide power assistance to move in one direction or another, to provide servo assistance to the steering as is well known in the art.

Circumposed about a portion of sleeve 17 is a cylindrical sleeve 25 which is fixed to the servo-piston 6 by a flanged portion at bearing 9 and thus travels with the servo-piston during its lift or power strokes; the other end of sleeve 25 is sealed about projection sleeve 17 by a seal 29. The servo-piston 6, outwardly of the sleeve 25, includes an enlarged diameter, annular, countersunk bore portion 26 which functionally contributes to shortening of and support of the servo-piston and yet accommodate full travel of the servo-piston through its strokes.

Integral with the cover 16 is a larger diametered projection sleeve 27 which telescopes into the countersunk portion bore portion 26 and supports movement of the servo-piston 6 through its lift or power strokes; a suitable seal 28 is provided between circumposed portions of sleeve 27 and the inner surface of the servo piston 6 into which the sleeve 27 telescopes.

The annular space 30, defined by the projection sleeve 27 and the inner surface of bore 4, provides an operational area reacting on the end of the servo-piston exposed in this operational area, and area 30 will have a suitable connection to the diagrammatic fluid pressure circuit of the system to be described. At the opposite end of the servo piston, i.e., between the inner surface of wall 5 and exposed portion of the servo-piston 6, is an annular operational area 31 defined by the bore 3, this area also being connected into the fluid circuit to be described.

A generally annular area 32 is defined between the outer surface of projection sleeve 17 and the inner surface of sleeve 27 which area 32 is connected tby means of a fluid line 40 to a sump or return S of the fluid circuit.

The fluid circuit is shown diagramatically, and the primary functional portions and fluid lines are shown; a pressure line 34, for example, communicates with operational area 30 and pressure is supplied from a pressure source 33; another pressure line 35 is connected at P to a conventional control valve 36 which includes fluid connections A and T, and connection A communicates through fluid line 37 connected to operational chamber 31. When the control valve 36 is in a neutral or central position 0, none of the connections P, T or A communicate with each other. In switch position a, connections P and A are in communication with each other and in still another position b communication between A and T occurs. The control valve, it will be understood, is merely illustrative, since valves of the character involved are well known in the art.

OPERATION OF THE CONTROL CYLINDER ASSEMBLY

For the purposes of explanation, it will be assumed that the operational or work (space) area 31, comprising a cross section of bore 3 (reduced by the cross section occupied by smaller diametered sleeve 17) is twice as large as the operational or work area (space) 30 which comprises a cross section of bore 4 (reduced by the cross section of the larger diametered sleeve 27). The space 30 is in constant communication with pressure line 34 connected to the pressure source 33; in the position o of valve 36, there will develope in spaces 30, 31 differential pressures based upon area size differences in the relationship between the areas 30, 31.

If the control valve 36 is oriented into position a, pressure will be transmitted from pressure source 33 through line 35 and connections P, A to pipe 37 so that pressure is directed into space 31; accordingly, development of pressure in this manner causes the servo piston 6 to move to the right. Likewise, reverse movement, where switching of valve 36 to position b is effected, a connection will be made to working space 31 through connections A, T and sump S, which also communicates with space 32 through a fluid line 40. The pressure in working space 31 would then be reduced, so that pressurized chamber 30 functions to move the servo piston 6 to the left.

As indicated by the broken lines showing control pipes to lines 37 and 35 to the steering valve 36, the valve 36 is provided with reaction areas which are stressed by the pressure from the working spaces 31 or 30, respectively. If, for example, valve 36 is switched into the switch position a, then pressure will increase in working space 31. This pressure-increase is transmitted to a reaction area via the pipe 37, and the control pipes branching off therefrom, in a manner so that the control valve is stressed counter to its switch-direction. The driving sensation (feel at steering wheel) is thereby transmitted to the driver of the vehicle. In the reverse, under a switching into the switch position b, the pressure in working space 31 is reduced so that also the pressure at associated reaction areas is reduced via pipe 37 and the control pipes branching off therefrom. Since the pressure of the working space 30 being transmitted to the other counter-effective reaction area via the pipes 34 and 35 and a control pipe branching off therefrom remains constant, there results in the whole also here a resistance counter to the movement of the control valve. This resistance is felt by the driver of the vehicle again as a sensation (feel characteristic) of driving the vehicle. It is to be noted here that the reaction areas are substantially in the same ratio as the effective areas of the associated working spaces.

In applicant's pending, allowed application directed to a control valve, Ser. No. 524,377, filed Nov. 15, 1974 and entitled "Servo Steering System For Motor Vehicles", there is disclosed a control valve, for example, of the character which can be used in the present application and which is only schematically illustrated herein. The control valve is housed in the casing 2 perpendicular to the axis of the steering worm shaft 11. An axially parallel level is connected with the steering nut 7, which lever is also termed a steering ruler, the lever penetrating a cavity in the servo-piston 6, and engaging an axially parallel groove in the housing 2. The groove is somewhat wider than the lever. A portion of the control valve extends into the groove and is activated therein by the lever.

A rotational movement of the steering work shaft 11 causes at first a rotational movement of the steering nut 7 and therewith also of the lever. The lever displaces the control valve to some extent; whereby the working space 31 is connected either with the pressure source 33 or with the reverse S. From this results a movement of the servo-piston 6 which axially pulls the steering nut 7 along with it. Insofar as the steering worm shaft 11 is no longer rotated, the axially-directed movement of the steering nut will simultaneously effect a rotation which is counter to the original rotation. This rotation continues as long as the lever, rotating simultaneously therewith, has switched the control valve 36 again into the switch position 0. During a malfunction of the hydraulics, the lever, after a short lost motion, would abut the housing 3 during a rotation of the steering worm shaft 11 and would thus prevent a further rotation of the steering nut 7. A continued rotation of the steering worm shaft 11 would then result in an axial displacement of the steering nut 7 nd therewith of the servo-piston 6, so that also a purely manual steering, without servo support, would be possible. A return positioning of the control valve into the switch position 0 however, is then no longer taking place automatically, but is achieved only by means of steering movements into the opposite directions.

In summary, it will be noted that the steering control valve always reacts to the movements of the steering wheel or the steering worm-gear shaft, independent of its special construction or arrangement, and in a manner so that the servo-piston moves in the direction of movement which is initiated by the steering worm-gear shaft.

It should be apparent, that with a uniform diameter at 3, by means of suitable diametering of the countersunk bore 26, it is possible to obtain different random areas or work space relationships between the operational areas 30, 31.

Likewise, the suppport sleeve or projection 27 can be constructed as a one-piece unit with cover 16, however, to facilitate manufacturing procedures and to avoid centering problems, it is advantageous to produce the sleeve as a separate unit and permit minor radial movement to facilitate assembling of the control cylinder assembly.

It will be noted that during the work strokes of the servo-piston, sleeve 27 supports the servo piston over its entire lift or work stroke, while sleeve 17 likewise supports the servo-piston through sleeve 25 circumposed thereabout.

The arrangements of sleeves 25, 17 and 27 define the internal chambers 30 and 32, while the countersunk bore 26 permits a relatively short functional unit to be constructed.

What is claimed is:

1. A control cylinder assembly for use in servo steering systems operatively connected to a fluid pressure circuit including a pressure source, fluid sump means and control valve means comprising, in combination: a cylindrical housing; a servo-piston moveable axially supported in the housing and defining opposed variable-volume operational areas therein; said servo-piston including steering nut means; a steering shaft projecting into said steering nut means for displacing the steering nut means; cover means connected to the housing and closing one variable-volume operational area defined by the servo-piston, said cover means being circumposed about said steering shaft, said cover means including a first axially projecting sleeve telescoped in supporting sealed relationship with an integral portion of said servo-piston and supporting the servo-piston during its entire path of axial movement in said housing; said cover means including a second axially projecting sleeve having a diameter larger than said first axially projecting sleeve and telescoped in sealed relationship into the servo-piston and also supporting the servo-piston during its entire path of axial movement, the first and second sleeves defining therebetween an annular chamber area to which a return line of the fluid pressure circuit is constantly connected to the fluid sump means, the second sleeve and the housing defining therebetween one of the variable-volume operational areas; one operational area being constantly connected to the pressure source; another operational area being optionally connectable by the control valve means to the pressure source or to the sump means.

2. The control cylinder assembly as claimed in claim 1 in which said servo-piston integral portion comprises a sleeve element integrally connected to the servo-piston and projecting axially in sealed relation about the first axially projecting sleeve of said cover means.

3. The control cylinder assembly as claimed in claim 1 in which said second axially projecting sleeve comprises an element separate from said cover means and which element is integrally connected to the cover means.

4. The control cylinder assembly as claimed in claim 1 in which said servo-piston includes an annular countersunk bore circumposed and sealed about second axially projecting sleeve of said cover means.

* * * * *